(12) United States Patent
Buckley et al.

(10) Patent No.: US 7,236,869 B2
(45) Date of Patent: Jun. 26, 2007

(54) BLENDED TORQUE ESTIMATION FOR AUTOMATIC TRANSMISSION SYSTEMS

(75) Inventors: Jamie M. Buckley, Brighton, MI (US); Amanda P. Wilson, Howell, MI (US); David W. Wright, Howell, MI (US)

(73) Assignee: General Motors Corporation, Detroit, MI (US)

( * ) Notice: Subject to any disclaimer, the term of this patent is extended or adjusted under 35 U.S.C. 154(b) by 613 days.

(21) Appl. No.: 10/836,660

(22) Filed: Apr. 30, 2004

(65) Prior Publication Data

US 2005/0246084 A1 Nov. 3, 2005

(51) Int. Cl.
*G06F 19/00* (2006.01)

(52) U.S. Cl. .................... 701/51; 701/54; 701/101; 701/102; 477/106; 477/107; 477/109; 477/110

(58) Field of Classification Search .............. 701/1, 701/51, 54, 110; 477/110
See application file for complete search history.

(56) References Cited

U.S. PATENT DOCUMENTS

| | | | | |
|---|---|---|---|---|
| 5,241,855 A * | 9/1993 | Cullen et al. | ............... | 73/117.3 |
| 5,452,207 A * | 9/1995 | Hrovat et al. | ............... | 701/1 |
| 5,577,474 A * | 11/1996 | Livshiz et al. | ............... | 123/352 |
| 5,771,482 A * | 6/1998 | Rizzoni | ............... | 701/101 |
| 5,792,021 A * | 8/1998 | Minowa et al. | ............... | 477/106 |
| 5,816,978 A * | 10/1998 | Tabata et al. | ............... | 477/156 |
| 6,064,935 A * | 5/2000 | You | ............... | 701/55 |
| 6,077,191 A * | 6/2000 | Minowa et al. | ............... | 477/109 |
| 6,090,011 A * | 7/2000 | Minowa et al. | ............... | 477/107 |
| 6,169,949 B1 * | 1/2001 | Sato | ............... | 701/51 |
| 6,188,944 B1 * | 2/2001 | Kolmanovsky et al. | ............... | 701/54 |
| 6,226,585 B1 * | 5/2001 | Cullen | ............... | 701/54 |
| 6,317,670 B1 * | 11/2001 | Okada et al. | ............... | 701/51 |
| 6,379,283 B1 * | 4/2002 | Cullen | ............... | 477/110 |
| 6,416,441 B1 * | 7/2002 | Eckert et al. | ............... | 477/185 |
| 6,427,109 B1 * | 7/2002 | Doering et al. | ............... | 701/54 |
| 6,584,391 B2 * | 6/2003 | Lack | ............... | 701/51 |
| 6,640,178 B2 * | 10/2003 | Wakamatsu et al. | ............... | 701/51 |
| 6,704,638 B2 * | 3/2004 | Livshiz et al. | ............... | 701/102 |
| 6,754,574 B2 * | 6/2004 | Tokura et al. | ............... | 701/67 |
| 6,866,024 B2 * | 3/2005 | Rizzoni et al. | ............... | 123/430 |
| 6,915,781 B2 * | 7/2005 | Rayl | ............... | 123/399 |
| 2002/0147552 A1 * | 10/2002 | Fonkalsrud et al. | ............... | 702/41 |
| 2004/0002805 A1 * | 1/2004 | Livshiz et al. | ............... | 701/102 |

* cited by examiner

*Primary Examiner*—Thomas Black
*Assistant Examiner*—Wae Lenny Louie
(74) *Attorney, Agent, or Firm*—Christopher DeVries

(57) ABSTRACT

A torque prediction module for an automatic transmission system includes a throttle-based torque prediction module. The throttle-based torque prediction module determines a first predicted torque of an engine in a vehicle that is based on a position of a throttle, an ambient air pressure, an intake temperature, and an engine speed. A torque offset module determines a torque offset that is based on the first predicted torque and a second predicted torque of the engine that is based on a mass airflow in an intake manifold of the engine. A blended torque module determines a third predicted torque of the engine that is based on the torque offset and the second predicted torque. A line pressure control module adjusts a line pressure of the automatic transmission based on the third predicted torque. An ECCC control module adjusts an amount of slip in an ECCC based on the third predicted torque.

14 Claims, 6 Drawing Sheets

BLENDED TORQUE ESTIMATION FOR AUTOMATIC TRANSMISSION SYSTEMS

FIELD OF THE INVENTION

The present invention relates to automatic transmission systems, and more particularly to estimating future input torque in automatic transmission systems.

BACKGROUND OF THE INVENTION

Pressurized hydraulic fluid in a transmission line pressure circuit actuates clutches in vehicles with automatic transmission systems. Sufficient line pressure must be applied in the automatic transmission systems with variable line pressure control to prevent applied clutches from slipping. However, it is also preferable to minimize line pressure to conserve fuel. An unnecessarily high line pressure may also cause a line pressure regulating system to enter a priority mode, which restricts oil flow to a transmission oil cooler.

An ideal line pressure is determined based on input torque to the transmission. However, torque increases when the vehicle accelerates and during other transient maneuvers. Proper line pressure must be applied simultaneously with the increase in torque. Because of hydraulic delays in a transmission line pressure control system, the input torque to the transmission is estimated prior to an actual increase in torque in the transmission so that a proper line pressure can be applied by the time the increase in torque takes place.

Some automatic transmissions include an electronically controlled capacity clutch (ECCC). An ECCC must apply proper pressure concurrently with the increase in input torque to prevent excessive torque flares and closed loop controller wind up. The input torque is estimated prior to the actual increase in torque to ensure that the clutch carries sufficient feed forward slip control.

In one conventional approach, the input torque to the transmission is estimated based on measured mass airflow in an intake manifold of the engine. However, mass airflow-based torque estimation is not accurate during transient maneuvers and does not significantly lead actual torque. In another conventional approach, the input torque is estimated based on a position of a throttle in the vehicle. However, throttle-based torque estimation is not as accurate as mass airflow-based torque estimation during steady-state conditions.

Conventional automatic transmission systems estimate torque in a worst case scenario, which leads to excessive line pressure application and ECCC instability.

SUMMARY OF THE INVENTION

A torque prediction module for an automatic transmission system according to the present invention includes a throttle-based torque prediction module. The throttle-based torque prediction module determines a first predicted torque of an engine in a vehicle that is based on a position of a throttle of the vehicle. A torque offset module determines a torque offset that is based on the first predicted torque and a second predicted torque of the engine that is based on a mass airflow in an intake manifold of the engine. A blended torque module determines a third predicted torque of the engine that is based on the torque offset and the second predicted torque.

In other features, the throttle-based torque prediction module determines the first predicted torque based on an ambient air pressure, an induction temperature in the intake manifold, the position, and a speed of the engine. A blended torque enable module determines a change in the position. The third predicted torque is equal to the sum of the second predicted torque and the torque offset. A line pressure control module adjusts a line pressure of the automatic transmission based on the third predicted torque.

In still other features of the invention, an electronically controlled capacity clutch (ECCC) control module determines an ECCC control signal that is based on the third predicted torque. The ECCC control module adjusts an amount of slip in an ECCC of the automatic transmission system with the ECCC control signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
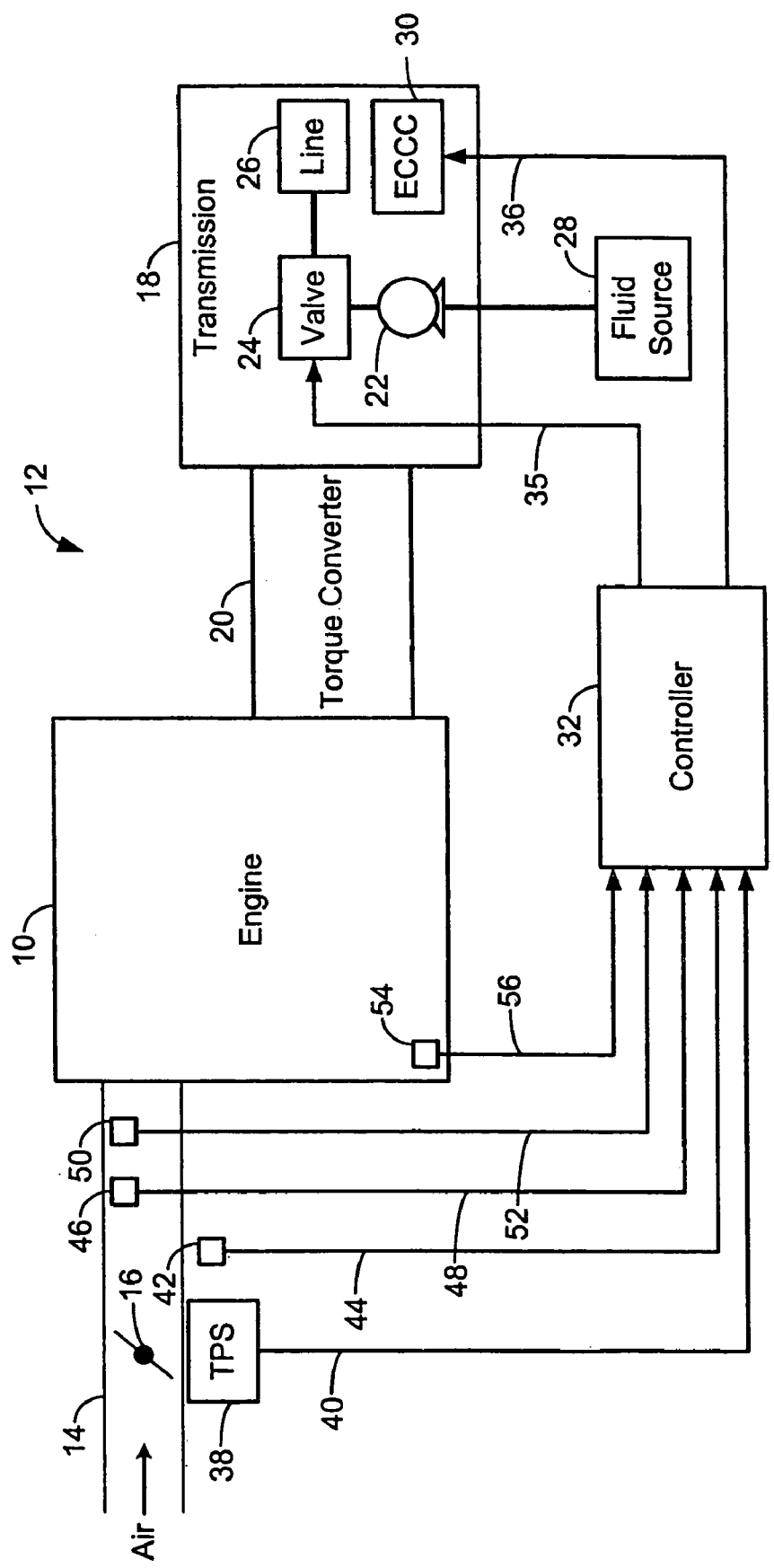
FIG. 1 illustrates an automatic transmission system for an engine of a vehicle including a controller that communicates with vehicle sensors according to the present invention.

The following description of the preferred embodiment(s) is merely exemplary in nature and is in no way intended to limit the invention, its application, or uses. For purposes of clarity, the same reference numbers will be used in the drawings to identify similar elements.

Referring to FIG. 1, air enters an engine 10 of a vehicle 12 through an intake manifold 14. A position of a throttle valve 16 in the intake manifold 14 controls an airflow rate to the engine 10. The airflow rate increases as the vehicle 12 accelerates. The air is mixed with fuel in the engine 10 and combusted to power the engine 10. The engine 10 drives an automatic transmission 18 through a torque converter 20. The automatic transmission 18 drives an output shaft through a selected gear ratio.

The automatic transmission 18 includes a pump 22, a regulator valve 24, and a transmission line pressure circuit 26. The pump 22 supplies transmission fluid to the transmission line pressure circuit 26 from a fluid source 28. The regulator valve 24 controls line pressure of the transmission line pressure circuit 26. The pressurized transmission fluid in the transmission line pressure circuit 26 actuates clutches to select gear ratios in the automatic transmission 18. When the automatic transmission 18 includes an electronically controlled capacity clutch (ECCC) 30, the ECCC 30 controls slip between a pressure plate and a housing cover of the torque converter 20.

A controller 32 requires a measurement of an input torque to the automatic transmission 18 to efficiently operate the regulator valve 24 and the ECCC 30. However, the input torque increases when the vehicle accelerates and during other transient maneuvers. Therefore, the controller 32 determines a predicted input torque prior to the actual increase in input torque. As a result, the regulator valve 24 and the ECCC 30 can apply proper pressure when the actual increase in input torque takes place. Based on the predicted input torque, the controller 32 adjusts a position of the regulator valve 24 with a line pressure control signal 35 and a pressure applied by the ECCC 30 with an ECCC control signal 36.

The controller 32 estimates the predicted torque based on signals from various vehicle sensors. A throttle position sensor (TPS) 38 transmits a throttle position signal 40 to the controller 32. An ambient air pressure sensor 42 transmits an ambient air pressure signal 44 to the controller 32. An induction temperature sensor 46 transmits an induction temperature signal 48 to the controller 32. A mass airflow (MAF) sensor 50 transmits an MAF signal 52 to the controller 32 from the intake manifold 14. A speed sensor 54 in the engine 10 transmits a speed signal 56 to the controller 32, which indicates a speed of the engine 10. While one controller is shown in FIG. 1, multiple controllers can be used. Additionally, the controller 32 may be part of an Engine Control Unit (ECU).

The controller 32 implements a torque prediction algorithm according to the present invention. The torque prediction algorithm estimates input torque based on the MAF rate in the intake manifold 14 during steady-state conditions. For example, a steady-state condition exists when the vehicle moves at a constant speed. During transient maneuvers, the torque prediction algorithm estimates input torque based on a combination of a first estimated input torque and a second estimated input torque. The first estimated input torque is based on the MAF rate in the intake manifold 14. The second estimated input torque is based on a position of the throttle valve 16. At the end of the transient maneuver, the predicted torque blends back to the MAF-based torque. A change in throttle position indicates a change in acceleration, and thus a change in the input torque to the automatic transmission 18. Therefore, a predetermined change in throttle position enables the torque prediction algorithm.

Figure 2:
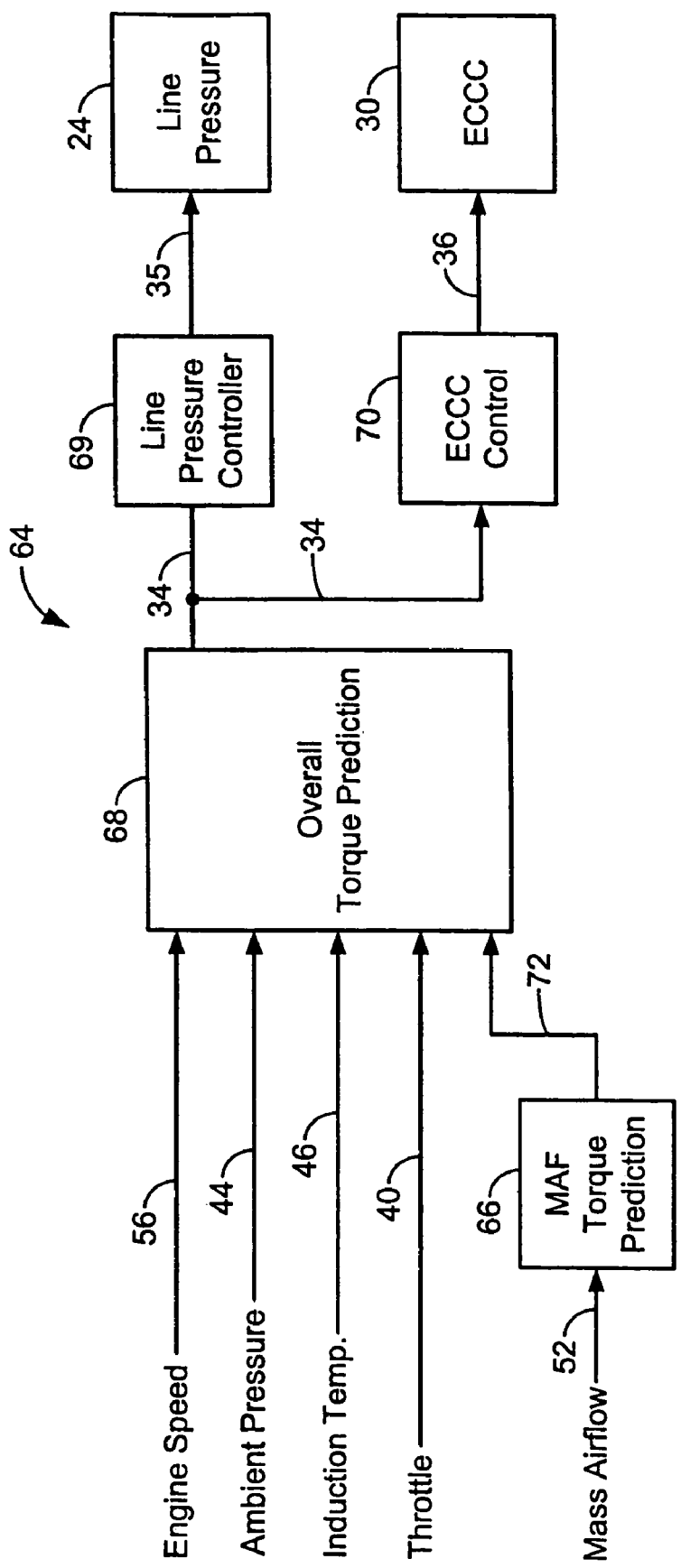
FIG. 2 is a functional block diagram of a torque prediction system according to the present invention.

Referring now to FIG. 2, the controller 32 implements a torque prediction system 64 according to the present invention. The torque prediction system 64 includes an MAF-based torque prediction module 66, an overall torque prediction module 68, a line pressure control module 69, and an ECCC control module 70. The MAF-based torque prediction module 66 generates an MAF predicted torque signal 72 based on the MAF signal 52. The value of the MAF predicted torque signal 72 is equal to a predicted input torque to the automatic transmission 18 based on the MAF rate in the intake manifold 14 of the engine 10.

The overall torque prediction module 68 generates the blended torque prediction signal 34 and a blended torque enable signal 74 based on the speed signal 56, the ambient air pressure signal 44, the induction temperature signal 48, the throttle position signal 40, and the MAF predicted torque signal 72. The ECCC control module 70 generates the ECCC control signal 36 based on the blended torque prediction signal 34. The line pressure control module 69 generates a line pressure control signal 35 based on the blended toque prediction signal 34.

Figure 3:
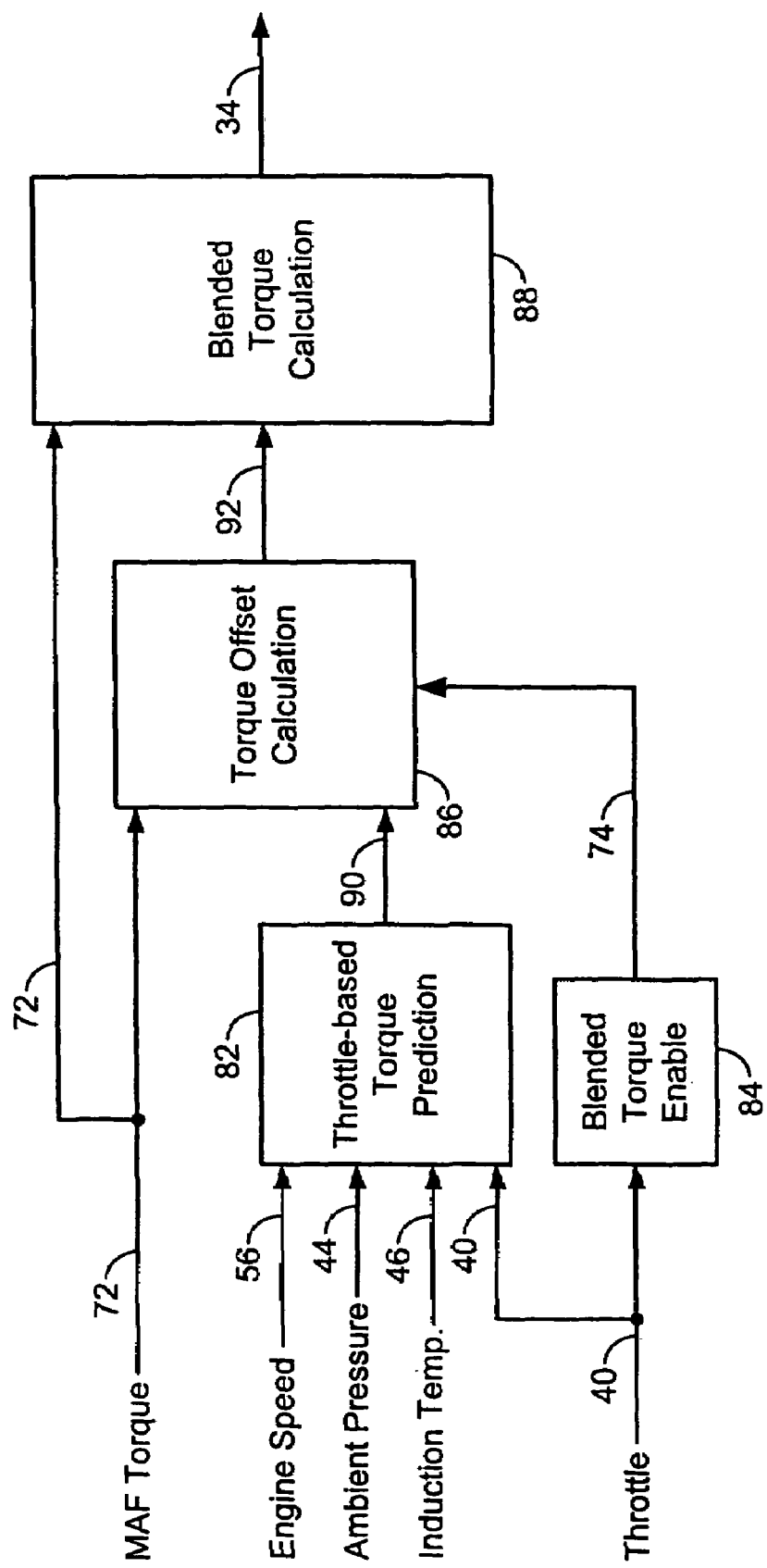
FIG. 3 is a functional block diagram of the torque prediction module in FIG. 2.

Referring now to FIG. 3, the overall torque prediction module 68 is illustrated in further detail. The overall torque prediction module 68 includes a throttle-based torque prediction module 82, a blended torque enable module 84, a torque offset module 86, and a blended torque module 88. The throttle-based torque prediction module 82 generates a throttle predicted torque signal 90 based on the speed signal 56, the ambient air pressure signal 44, the induction temperature signal 48, and the throttle position signal 40.

The throttle-based torque prediction module 82 determines the value of the throttle predicted torque signal 90 by taking the product of a first scaled torque estimation and a second scaled torque estimation. The first scaled torque estimation is determined based on the values of the ambient air pressure signal 44 and the induction temperature signal 48. The second scaled torque estimation is determined based on the values of the speed signal 56 and the throttle position signal 40. For example, the second scaled torque estimation may be determined from a torque look-up table based on the speed of the engine 10 and the position of the throttle valve 16.

The blended torque enable module 84 generates the blended torque enable signal 74 based on the throttle position signal 40, as will be described in further detail below. The torque offset module 86 generates a torque offset signal 92 based on the MAF predicted torque signal 72, the throttle predicted torque signal 90, and the blended torque enable signal 74. The torque offset module 86 calculates the difference between the value of the throttle predicted torque signal 90 and the value of the MAF predicted torque signal 72. The torque offset module 86 filters the difference to generate the value of the torque offset signal 92. For example, a first order lag filter may be used to blend the values of the throttle predicted torque signal 90 and the MAF predicted torque signal 72. The blended torque module 88 generates the blended torque prediction signal 34 based on the MAF predicted torque signal 72 and the torque offset signal 92, as will be described in further detail below.

Figure 4:
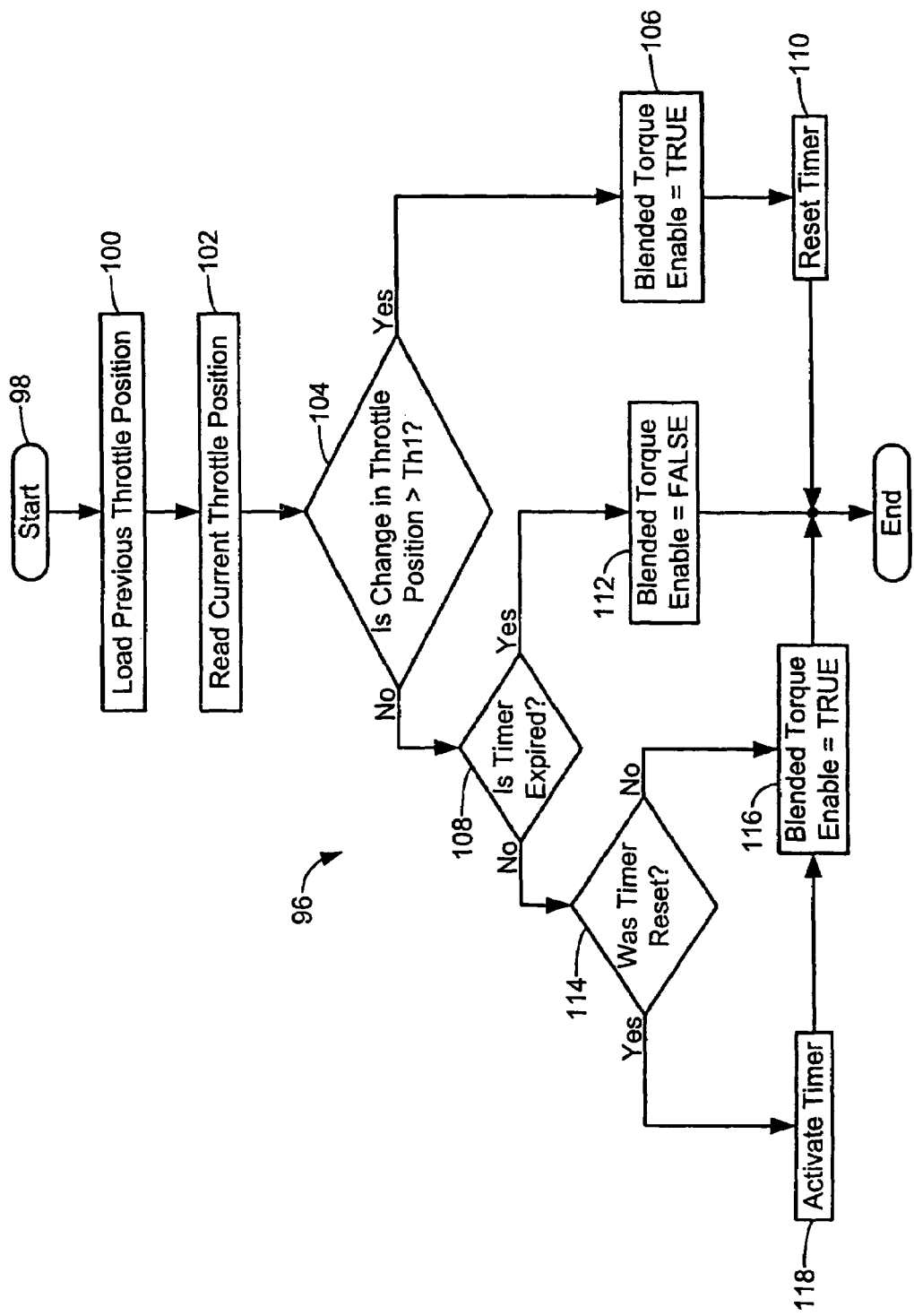
FIG. 4 is a flowchart illustrating steps performed by the blended torque enable module in FIG. 3.

Referring now to FIG. 4, a blended torque enable algorithm 96 that is implemented by the blended torque enable module 84 of FIG. 3 begins in step 98. In step 100, control loads a previous value of the throttle position signal 40. In step 102, control reads a current value of the throttle position signal 40. In step 104, control determines whether a difference between the current value and the previous value of the throttle position signal 40 is greater than a predetermined value. If true, control proceeds to step 106. If false, control proceeds to step 108. In step 106, control sets the blended torque enable signal 74 to TRUE. In step 110, control resets a timer and control ends.

In step 108, control determines whether the timer is expired. For example, the timer may initially be set to a predetermined value. Once activated, the timer may expire when the timer decrements to zero. If true, control proceeds to step 112. If false, control proceeds to step 114. In step 112, control sets the blended torque enable signal 74 to FALSE and control ends. In step 114, control determines whether the timer was reset. If true, control proceeds to step 118. If false, control proceeds to step 116. In step 118, control activates the timer. In step 116, control sets the blended torque enable signal 74 to TRUE and control ends.

Figure 5:
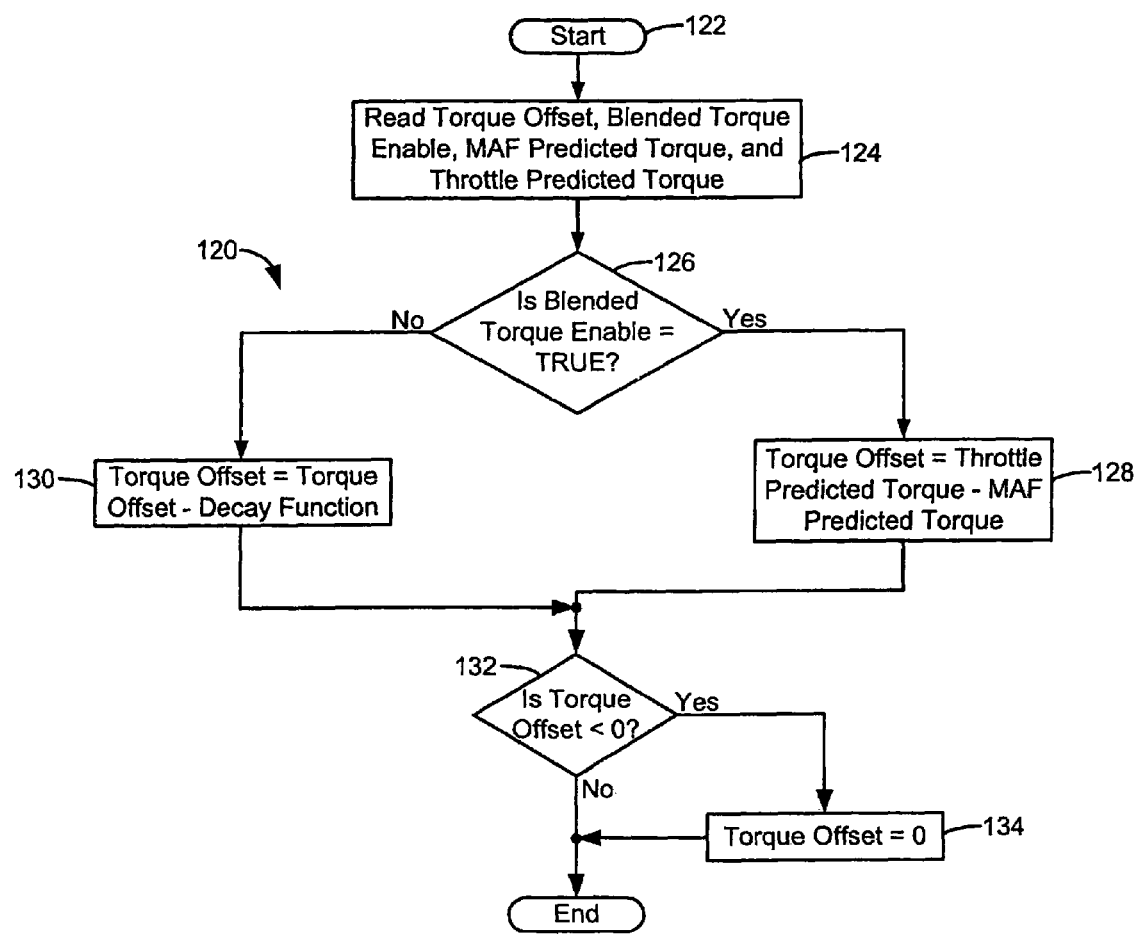
FIG. 5 is a flowchart illustrating steps performed by the torque offset module in FIG. 3.

Referring now to FIG. 5, a torque offset algorithm 120 that is implemented by the torque offset module 86 of FIG. 3 begins in step 122. In step 124, control reads current values for the torque offset signal 92, the blended torque enable signal 74, the throttle predicted torque signal 90, and the MAF predicted torque signal 72. In step 126, control determines whether the blended torque enable signal 74 is equal to TRUE. If true, control proceeds to step 128. If false, control proceeds to step 130.

In step 128, control sets the value of the torque offset signal 92 equal to the difference between the value of the throttle predicted torque signal 90 and the value of the MAF predicted torque signal 72. In step 130, control sets the value of the torque offset signal 92 equal to the difference between the current value of the torque offset signal 92 and a decay function. Control proceeds from both steps 128 and 130 to step 132. In step 132, control determines whether the value of the torque offset signal 92 is less than zero. If false, control ends. If true, control proceeds to step 134. In step 134, control sets the value of the torque offset signal 92 equal to zero and control ends.

Figure 6:
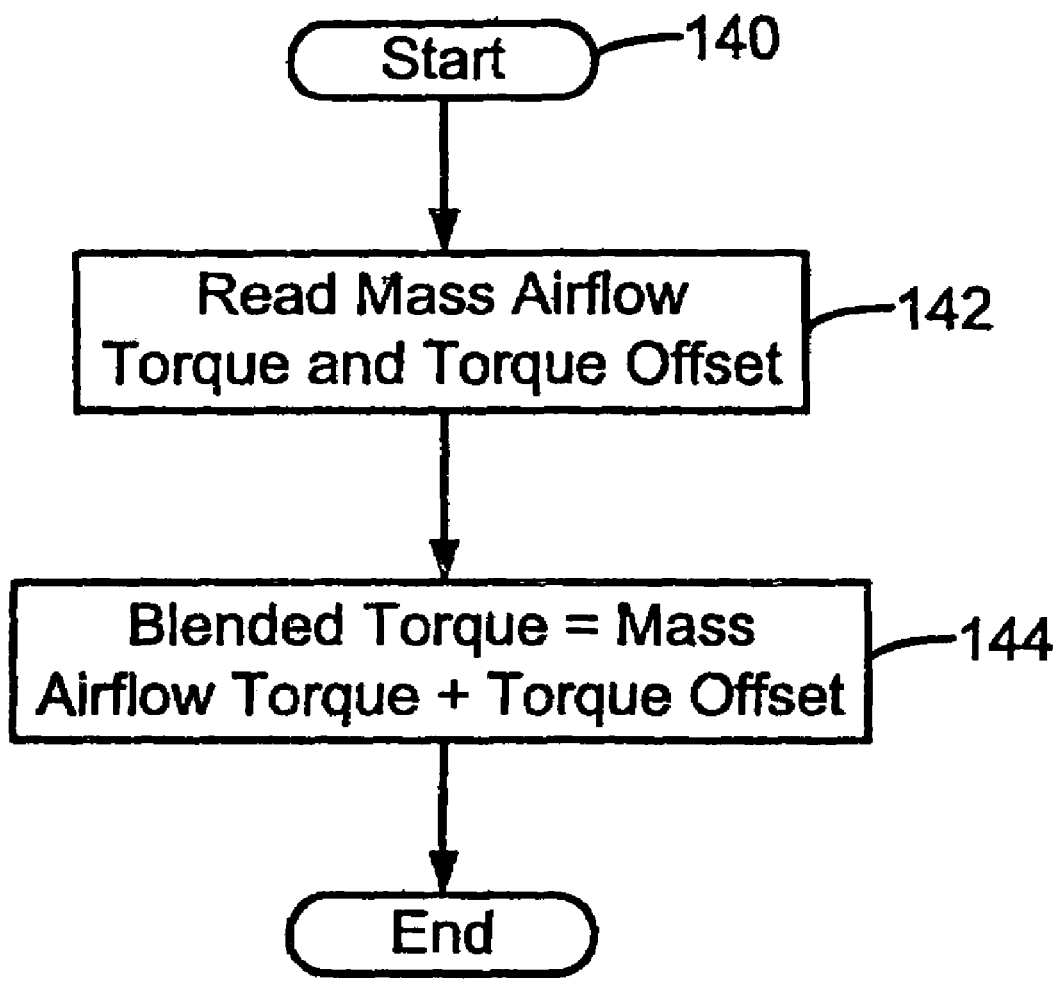
FIG. 6 is a flowchart illustrating steps performed by the blended torque module in FIG. 3.

Referring now to FIG. 6, a blended torque algorithm begins in step 140. In step 142, control reads current values of the MAF predicted torque signal 72 and the torque offset signal 92. In step 144, control sets the value of the blended torque prediction signal 34 equal to the sum the value of the MAF predicted torque signal 72 and the torque offset signal 92, and control ends.

The torque prediction system 64 of the present invention allows for greater precision in determining an ideal line pressure of a transmission line as well an ideal applied pressure for an ECCC in an automatic transmission. The torque prediction system 64 utilizes MAF-based torque estimation during steady-state conditions and throttle-based torque estimation during transient conditions, when each is a more accurate prediction of input torque. This leads to increased fuel economy as well as smoother and more precise shifting in automatic transmissions.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A torque prediction module for an automatic transmission system, comprising:
    a throttle-based torque prediction module that determines a first predicted torque of an engine in a vehicle that is based on a position of a throttle of said vehicle;
    a torque offset module that determines a torque offset that is based on said first predicted torque and a second predicted torque of said engine that is based on a mass airflow in an intake manifold of said engine; and
    a blended torque module that determines a third predicted torque of said engine that is based on said torque offset and said second predicted torque.

2. The torque prediction module of claim 1 wherein said throttle-based torque prediction module determines said first predicted torque based on an ambient air pressure, an induction temperature in said intake manifold, said position, and a speed of said engine.

3. The torque prediction module of claim 1 further comprising:
    a blended torque enable module that determines a change in said position.

4. The torque prediction module of claim 3 wherein said third predicted torque is equal to the sum of said second predicted torque and said torque offset.

5. The torque prediction module of claim 1 wherein a line pressure control module adjusts a line pressure of said automatic transmission based on said third predicted torque.

6. The torque prediction module of claim 3 further comprising:
    an electronically controlled capacity clutch (ECCC) control module that determines an ECCC control signal that is based on said third predicted torque.

7. The torque prediction module of claim 6 wherein said ECCC control module adjusts an amount of slip in an ECCC of said automatic transmission system with said ECCC control signal.

8. A method for predicting a torque of an engine for an automatic transmission system in a vehicle, comprising:
    determining a first predicted torque of said engine that is based on a position of a throttle of said vehicle;
    determining a torque offset that is based on said first predicted torque and a second predicted torque of said engine that is based on a mass airflow in an intake manifold of said engine; and
    determining a third predicted torque of said engine that is based on said torque offset and said second predicted torque.

9. The method of claim 8 wherein said first predicted torque is based on an ambient air pressure, an induction temperature in said intake manifold, said position, and a speed of said engine.

10. The method of claim 8 further comprising determining a change in said position.

11. The method of claim 10 wherein said third predicted torque is equal to the sum of said second predicted torque and said torque offset.

12. The method of claim 8 further comprising adjusting a line pressure of said automatic transmission based on said third predicted torque.

13. The method of claim 10 further comprising determining an electronically controlled capacity clutch (ECCC) control signal that is based and said third predicted torque.

14. The method of claim 8 further comprising adjusting an amount of slip in said ECCC of said automatic transmission system with said ECCC control signal.

* * * * *